US00RE39378E

(19) United States
(12) Reissued Patent
Dugan et al.

(10) Patent Number: US RE39,378 E
(45) Date of Reissued Patent: Nov. 7, 2006

(54) OPTICAL CHANNEL REGULATOR AND METHOD

(75) Inventors: J. Michael Dugan, Richardson, TX (US); Kenneth Y. Maxham, Richardson, TX (US)

(73) Assignee: Alcatel, Paris (FR)

(21) Appl. No.: 10/802,118

(22) Filed: Mar. 16, 2004

Related U.S. Patent Documents

Reissue of:
(64) Patent No.: 5,923,450
Issued: Jul. 13, 1999
Appl. No.: 09/164,224
Filed: Sep. 30, 1998

U.S. Applications:
(60) Provisional application No. 60/060,526, filed on Sep. 30, 1997.

(51) Int. Cl.
*H04J 14/02* (2006.01)
*H04B 10/18* (2006.01)

(52) U.S. Cl. ..... 398/95; 398/197; 398/201; 398/82; 398/94; 385/140

(58) Field of Classification Search ..... 398/95, 398/140, 34, 38, 79, 81–82, 91, 94, 197, 398/201; 385/140
See application file for complete search history.

(56) References Cited

U.S. PATENT DOCUMENTS 5,392,154 A * 2/1995 Chang et al. ..... 359/341.3
5,557,439 A * 9/1996 Alexander et al. ..... 398/87
5,812,710 A * 9/1998 Sugaya ..... 385/27
5,815,299 A * 9/1998 Bayart et al. ..... 398/94
5,900,983 A * 5/1999 Ford et al. ..... 359/627
5,963,291 A * 10/1999 Wu et al. ..... 349/196
5,970,201 A * 10/1999 Anthony et al. ..... 385/140
5,974,216 A * 10/1999 Nakaya ..... 385/140
6,031,647 A * 2/2000 Roberts ..... 398/94
6,157,475 A * 12/2000 Dugan et al. ..... 398/26

FOREIGN PATENT DOCUMENTS

EP 0637148 A1 * 7/1994
EP 0762677 A2 * 8/1997
GB 2294170 * 7/1995

* cited by examiner

*Primary Examiner*—Leslie Pascal
(74) *Attorney, Agent, or Firm*—Jessica W. Smith; V. Lawrence Sewell

(57) ABSTRACT

An optical channel regulator (46) is provided. The optical channel regulator (46) includes a tapped optical coupler (60) receiving an optical line carrying an optical signal. The tapped optical coupler (60) provides substantially all of the optical signal as an output. An electrically variable optical attenuator (64) receives the output of the tapped optical coupler (60) and attenuates the optical signal responsive to a feedback control signal. A second tapped optical coupler (66) receives an output of the attenuator (64). The second coupler (66) provides substantially all of the received optical signal as an output and provides a remaining portion of the optical signal as a tapped output. An optical detector (68) then receives the tapped output and provides an output signal representing the optical signal. A comparator (70) receives the output signal of the optical detector (68) and a reference signal. The comparator (70) compares the output signal and the reference signal and provides the feedback control signal to the attenuator (64) responsive to the comparison. As part of a multi-channel communication system, the regulator is used to adjust the levels of each channel for automatically maintaining channel balance and equalization.

6 Claims, 3 Drawing Sheets

OPTICAL CHANNEL REGULATOR AND METHOD

Matter enclosed in heavy brackets [ ] appears in the original patent but forms no part of this reissue specification; matter printed in italics indicates the additions made by reissue.

*This application claims priority under 35 U.S.C. 119(e) to Provisional Application No. 60/060,526 filed Sep. 30, 1997.*

TECHNICAL FIELD OF THE INVENTION

This invention relates in general to optical communication systems, and more particularly to an optical channel regulator and method.

BACKGROUND OF THE INVENTION

In multiple channel wavelength division multiplexed (WDM) communication systems, optical amplifiers are used to boost signal powers to provide for longer transmission spans. When using optical amplifiers in such systems, it is important to balance the channels at the input to the amplifiers to assure that the available amplifier output power is shared equally among the channels. If the channels are not balanced across each amplifier input, the weaker signals reduce the transmission span distance.

Another problem faced is that optical amplifiers used in multiple channel wavelength division multiplexed communication systems often do not have uniform gain across all of the optical channels. This creates some channel imbalance. In other systems where optical amplifiers are used as repeaters, the cascade of the amplifiers results in signal inequalities even when they are well balanced at the head end.

Other problems relate to the configuration of a bi-directional line amplifier (BDLA) which uses a single amplifier. The receive signals from each direction needs to be balanced to assure proper gain and power sharing in the amplifier. Further, significant power level imbalances between channels at the end of a cascade of amplifiers may require attenuation of the strong channels to keep the signal level to the receiver at an acceptable level.

One conventional solution to balancing of channels has been to insert manually selected fixed attenuators or manually adjusted variable attenuators in each channel path before multiplexing them together. However, the selection or the adjustment of the attenuators requires manual measurement of each optical channel, since the source transmitter power level for each channel varies and is not precisely known beforehand. Furthermore, when the source transmit power changes, due to aging or module replacement, the attenuator adjustment process has to be repeated.

SUMMARY OF THE INVENTION

The present invention provides an optical channel regulator method that substantially eliminates or reduces disadvantages and problems associated with previously developed optical channel regulation schemes.

More specifically, the present invention provides a method for regulating an optical channel. The optical channel regulator includes an electrically variable optical attenuator receiving an optical signal. The attenuator attenuates the optical signal responsive to a feedback control signal and yields an attenuated optical signal. A tapped optical coupler receives the attenuated optical signal of the attenuator and provides substantially all of the attenuated optical signal as an output. The tapped optical coupler also provides a remaining portion of the attenuated optical signal as a tapped output. An optical detector receives the tapped output and provides an electrical signal representing the attenuated optical signal. A comparator receives the electrical signal of the optical detector and a reference signal. Finally, the comparator compares the electrical signal to the reference signal and provides a feedback control signal to the attenuator.

The present invention provides an important technical advantage by eliminating the need for manual measurement and selection of fixed attenuators required for balancing the channels.

The present invention provides another technical advantage by solving the problem of balancing the power levels at bi-directional line amplifiers using a single amplifier.

Additional technical advantages should be readily apparent from the drawings, description, and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The optical channel regulator of the present invention electronically performs a power level measurement for each channel of a wavelength division multiplexed communication system. The optical channel regulator of the present invention also electronically varies the path attenuation to bring all optical channels into balance before being combined in a multiplexer and before being amplified. If the balance changes at a later time, the control system automatically readjusts to maintain the balance.

More specifically, the present invention provides a method for regulating an optical channel. The optical channel regulator includes an electrically variable optical attenuator receiving an optical signal. The attenuator attenuates the optical signal responsive to a feedback control signal and yields an attenuated optical signal. A tapped optical coupler receives the attenuated optical signal of the attenuator and provides substantially all of the attenuated optical signal as an output. The tapped optical coupler also provides a remaining portion of the attenuated optical signal as a tapped output. An optical detector receives the tapped output and provides an electrical signal representing the attenuated optical signal. A comparator receives the electrical signal of the optical detector and a reference signal. Finally, the comparator compares the electrical signal to the reference signal and provides a feedback control signal to the attenuator.

Figure 1:
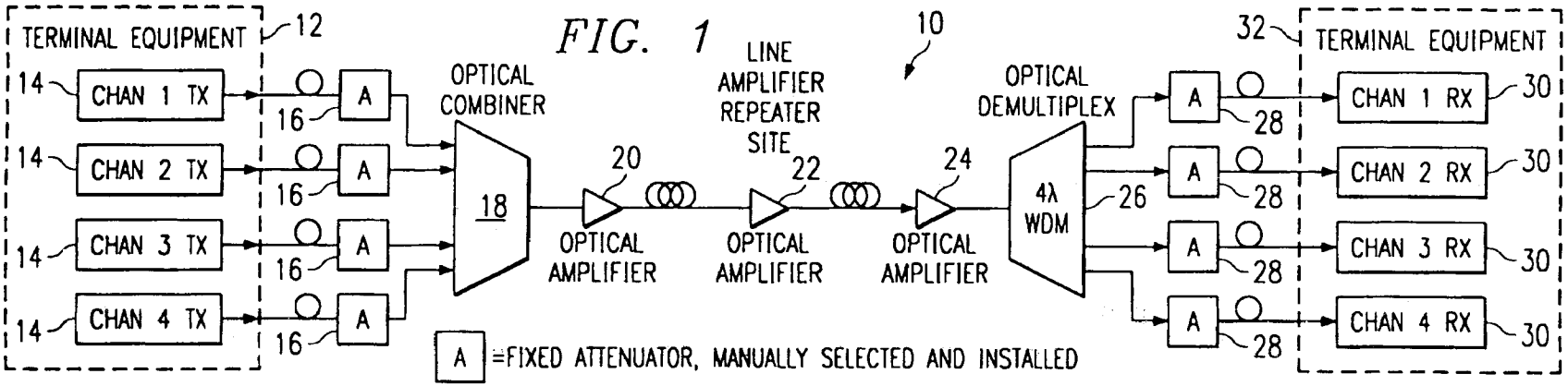
FIG. 1 is a block diagram of one embodiment of a conventional four-channel wavelength division multiplexed communication system with optical amplification using unidirectional transmission on the optical fiber.

FIG. 1 is a block diagram of one embodiment of a conventional unidirectional four-channel wavelength division multiplexed system, indicated generally at 10, with optical amplification. System 10 includes terminal equipment 12 having a plurality of transmit channels 14. Although only transmit channels 14 are shown in FIG. 1, terminal equipment 12 may also include receive channels. Each transmit channel 14 is connected and provides an optical signal to a fixed attenuator 16. Each attenuator 16 is manually selected or adjusted, and provides fixed attenuation of the optical signal. The attenuators 16 are connected to an optical combiner 18 that provides an output to an optical amplifier 20 which wavelength division multiplexes the plurality of optical signals. Optical amplifier 20 feeds an amplified signal to an optical amplifier 22. Optical amplifier 22 then feeds an optical amplifier 24. Optical amplifier 22 may be located at a line amplifier repeater site, as shown. The number of optical amplifiers in the transmission path are dependent upon a number of factors, including the length over which the signal must travel.

Optical amplifier 24 provides an output to an optical demultiplexer 26 that recovers the plurality of optical signals and provides each optical signal to one of a plurality of fixed attenuators 28. The attenuators 28 are also manually selected or adjusted, and provide fixed attenuation of the optical signal. Each attenuator 28 is connected to a receive channel 30 of terminal equipment 32.

Fixed attenuators 16 and 28 operate to balance the optical channels, but are manually selected and installed or manually adjusted variable attenuators. The selection or adjustment of attenuators 16 and 28 involves manual measurement of each optical channel since the source transmitter power level for each channel varies, and is not precisely known beforehand.

Furthermore, when the source transmit power changes, due to aging or module replacement, the attenuator selection or adjustment process needs to be repeated. Thus, there is little flexibility when line conditions change.

Figure 2:
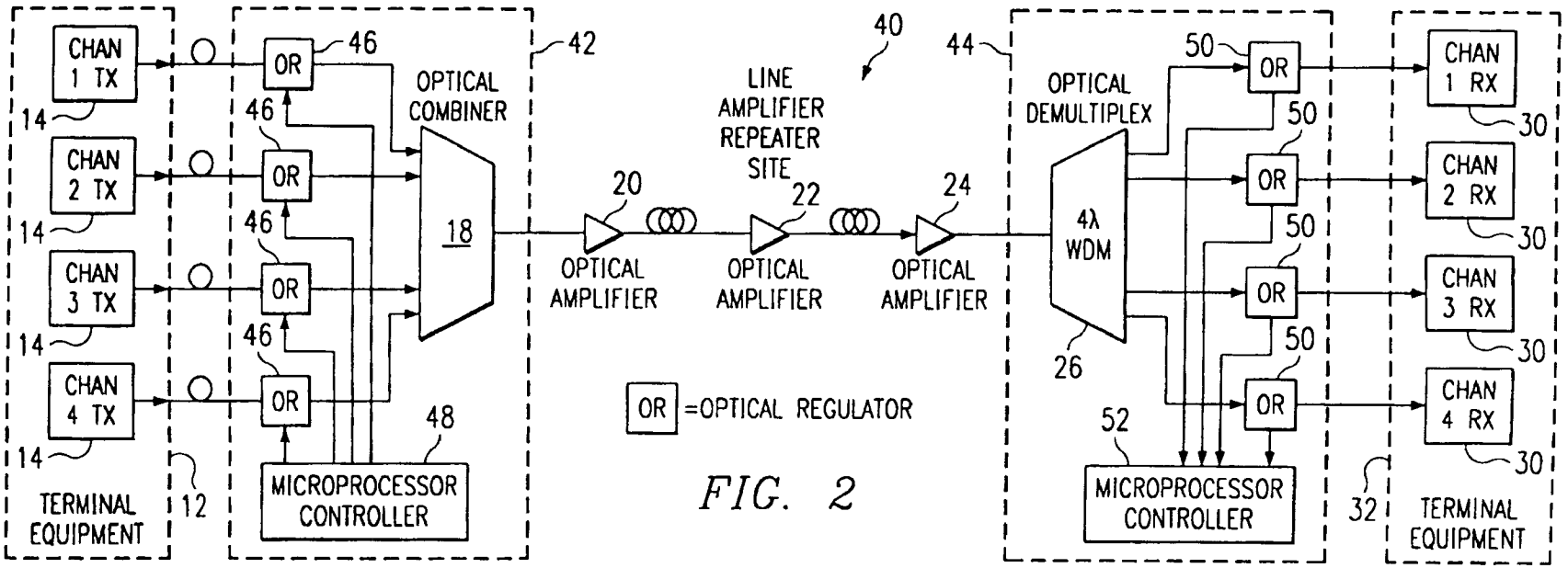
FIG. 2 is a block diagram of one embodiment of an improved four-channel wavelength division multiplexed communication system with optical regulators according to the present invention.

FIG. 2 is a block diagram of one embodiment of an improved four-channel wavelength division multiplexed system, indicated generally at 40, with optical regulators according to the present invention. As shown, system 40 is similar to system 10 of FIG. 1. However, an optical regulator assembly 42 and an optical regulator assembly 44 have replaced the fixed attenuators 16 and 28 of FIG. 1. In FIG. 2, each transmit channel 14 is connected to an optical regulator 46 which then feeds optical combiner 18. As shown, each optical regulator 46 receives an input from a microprocessor controller 48. Similarly, the outputs of optical demultiplexer 26 are connected to optical regulators 50 that receive an input from a microprocessor controller 52.

According to the present invention, optical regulators 46 and 50 electronically perform a power level measurement for each channel and electronically vary the path attenuation to bring the optical channels into balance before being combined in optical combiner 18 and after being separated by optical demultiplexer 26. The input from microprocessor controllers 48 or 52 provide a level against which to compare the level of the respective channel. If the balance changes at a later time, system 40 can thus automatically readjust to maintain the balance.

Figure 3:
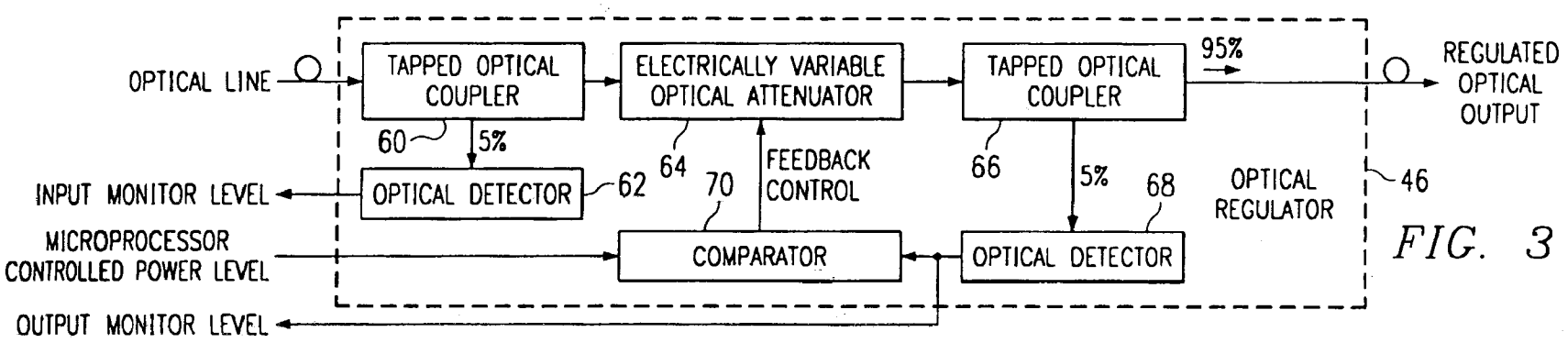
FIG. 3 is a block diagram of one embodiment of an optical regulator according to the present invention.

FIG. 3 is a block diagram of one embodiment of an optical regulator 46 (or 50) according to the present invention. Optical regulator 46 may include a tapped optical coupler 60 that receives an optical line carrying the optical signal. Taped optical coupler 60 provides substantially all of the optical signal (e.g., 95%) as an output to an electrically variable optical attenuator 64. The remaining portion of the signal (e.g., 5%) is provided to an optical detector 62 that provides an input monitor level signal, as shown. Optical attenuator 64 operates to attenuate the optical signal responsive to a feedback control signal. A second tapped optical coupler 66 receives the output of optical attenuator 64 and provides substantially all of the received optical signal (e.g., 95%) as an output. The remaining portion of the optical signal (e.g., 5%) is provided as a tapped output. An optical detector 68 receives the tapped output and provides an output signal (output monitor level) representing the optical signal to a comparator 70. Comparator 70 compares the output signal of optical detector 68 with a microprocessor controlled reference signal (microprocessor controlled power level) and, in response, provides the feedback control signal to optical attenuator 64.

According to the present invention, optical regulator 46 taps the optical line and compares the signal with a controlled power level. The controlled power level is provided by a microprocessor controller, for example, as shown in FIG. 2. The microprocessor controller receives the input monitor level from optical detector 62 and the output monitor level from output detector 68. The microprocessor controller then processes those inputs according to executed program code and generates the microprocessor controlled power level used as a reference by comparator 70. Based upon the comparison, feedback may be provided to electrically vary optical attenuator 64 to regulate the power level of the optical signal. It should be noted that optimum balance often can be best determined at the received end of the systems. This may mean that the channels at the transmit end are deliberately unequal. It also should be noted that often the optimum balance at the receive end may be determined by signal-to-noise ratio rather than power level.

Figure 4:
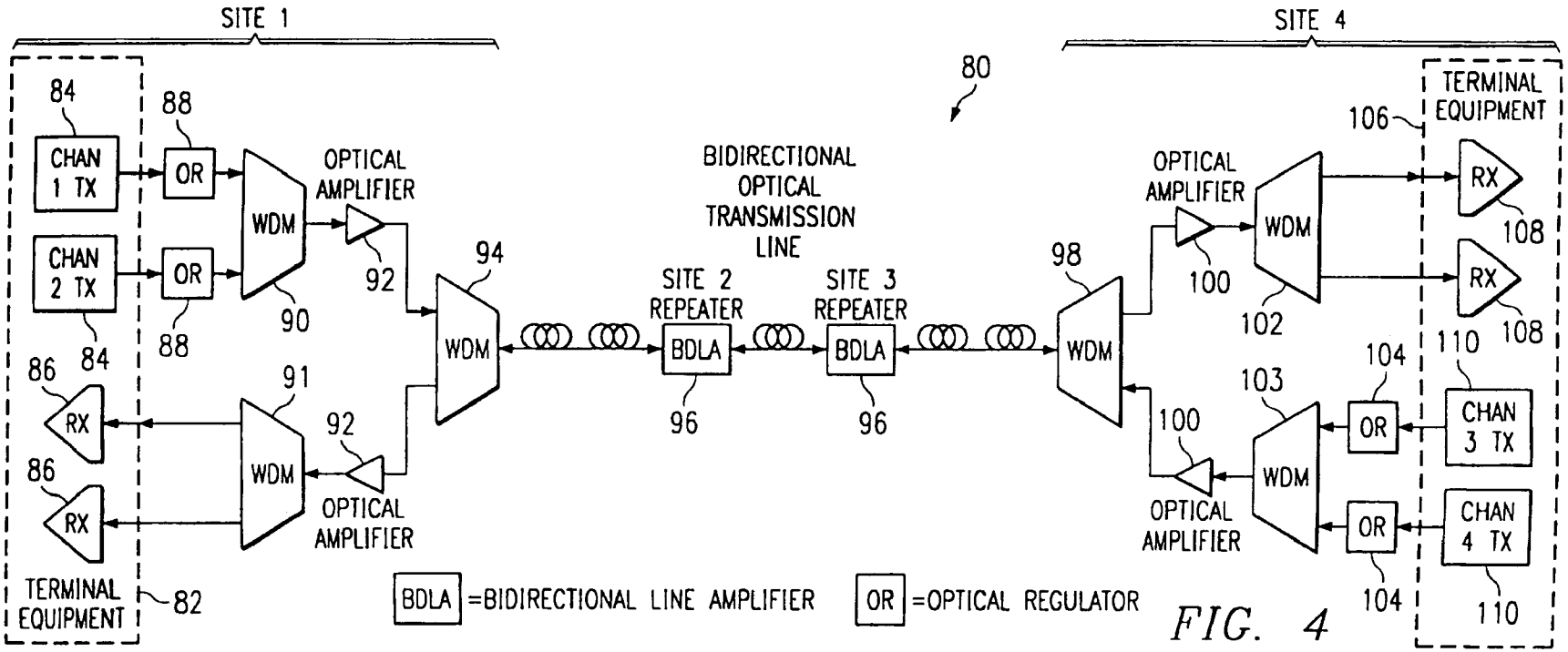
FIG. 4 is a block diagram of one embodiment of a four-channel wavelength division multiplexed system using bi-directional transmission on the optical fiber according to the present invention.

FIG. 4 is a block diagram of one embodiment of a bi-directional four-channel wavelength division multiplexed system, indicated generally at 80, according to the present invention. System 80 includes terminal equipment 82 located at a first site. Terminal equipment 80 provides transmit channels 84 and receive channels 86. Each transmit channel 84 is connected to an optical regulator 88. Outgoing signals are multiplexed by a combiner 90, and incoming signals are separated by demultiplexer 91. Optical amplifiers 92 provide signals to or receive signals from a multiplexer 94, as shown. System 80 includes a bi-directional optical transmission line having a plurality of bi-directional line amplifiers 96 located at repeater sites.

On the opposite side of the transmission line, a multiplexer 98 provides signals to and receives signals from amplifiers 100. Incoming signals are provided to a demultiplexer 102 to separate the multiplexed signals. Outgoing signals are provided to a combiner 103 by optical regulators 104, as shown. Optical regulators 104 are connected as shown to terminal equipment 106 that provides receive channels 108 and transmit channels 110. It should be understood that microprocessor control of optical regulators 88 and 104, although not shown, is similar to that shown in FIG. 2.

Figure 5:
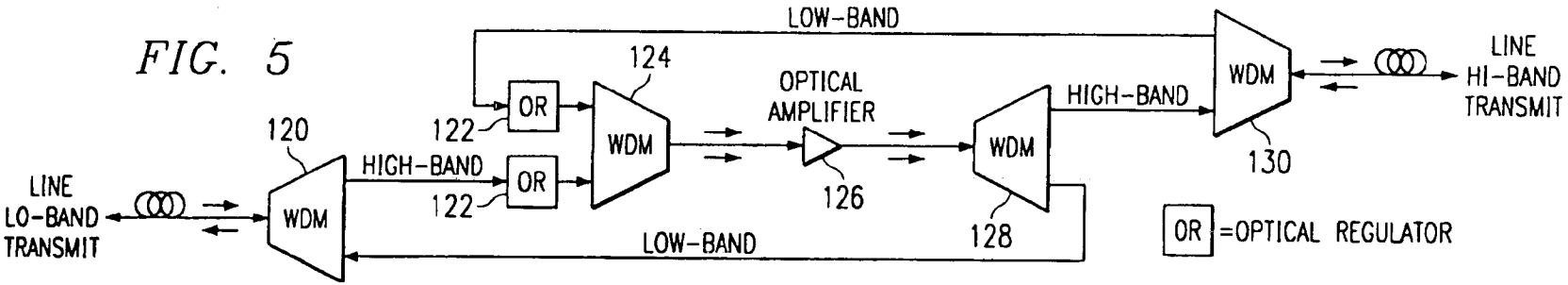
FIG. 5 is a block diagram of one embodiment of a bi-directional wavelength division multiplexed line amplifier with a single amplifier according to the present invention.

FIG. 5 is a block diagram of one embodiment of a bi-directional wavelength division multiplexed line amplifier with a single amplifier according to the present invention. As shown, a multiplexer 120 communicates across a bi-directional line. Multiplexer 120 is connected to an optical regulator 122 which is connected to another multiplexer 124. Multiplexer 124 is also connected to a second optical regulator 122, as shown. An optical amplifier 126 receives a signal from multiplexer 124 and provides an amplified signal to a multiplexer 128. Multiplexer 128, in turn provides signals to a multiplexer 130 as well as multiplexer 120. As shown, the use of optical regulators 122 according to the present invention allows balancing of the power levels at bi-directional line amplifiers using a single amplifier 126.

Figure 6:
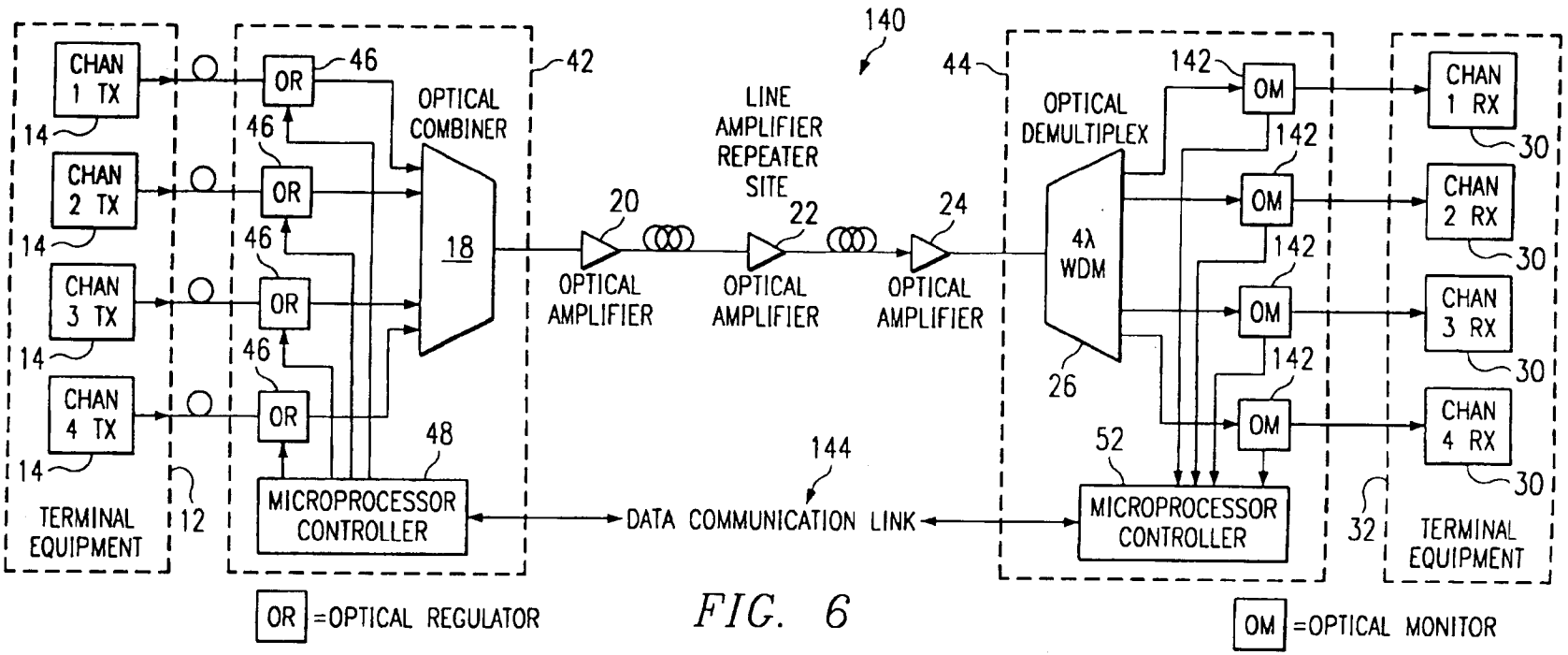
FIG. 6 is a block diagram of one embodiment of a wavelength division multiplexed communication system with end-to-end channel power control feedback according to the present invention.

FIG. 6 is a block diagram of one embodiment of a wavelength division multiplexed system, 140, with end-to-end channel power control feedback according to the present invention. System 140 is similar to system 40 of FIG. 2. However, optical regulators 50 of FIG. 2 are shown as optical monitors 142. Note that the detector 62 in the optical regulator can be used for the optical monitor 142. Further, microprocessor controller 52 is linked to microprocessor controller 48 by a data communication link 144. The link provided by data communication link 144 allows feedback from one end point to the other concerning the channel power control provided by optical regulators 46 and optical monitors 142. This data communication link is typically provided by an optical supervisory channel that is integrated into the optical communication system.

Although the present invention has been described in detail, it should be understood that various substitutions, changes and alterations can be made hereto without departing from the spirit and scope of the invention as defined by the appended claims.

What is claimed is:

[1. An optical channel regulator, comprising:

an electrically variable optical attenuator receiving an optical signal, the attenuator operating to attenuate the optical signal responsive to a feedback control signal and to provide an attenuated optical signal;

a tapped optical coupler receiving the attenuated optical signal of the attenuator, the optical coupler operating to provide substantially all of the attenuated optical signal as an output and to provide a remaining portion of the attenuated optical signal as a tapped output;

an optical detector receiving the tapped output and providing an electrical signal representing the attenuated optical signal; and a comparator receiving the electrical signal of the optical detector and a reference signal, the comparator operating to compare the electrical signal, the reference signal, and responsive to the comparison to provide the feedback control signal to the attenuator.]

[2. The optical channel regulator of claim 1 further comprising:

a second tapped optical coupler receiving an input optical signal, the second tapped optical coupler providing substantially all of the input optical signal as the optical signal received by the electrically variable optical attenuator and providing a remaining portion of the input optical signal as a tapped output; and a second optical detector receiving the tapped output from the second tapped optical coupler and providing an electrical signal representing the input optical signal.]

3. An optical regulator assembly comprising:

a plurality of optical channel regulators, each optical channel regulator comprising:

an electrically variable optical attenuator;

a tapped optical coupler;

an optical detector; and a comparator; and a microprocessor, operable to:

receive the electrical signal representing the attenuated optical signal from each of the plurality of optical channel regulators;

generate a plurality of reference signals responsive to the electrical signals; and provide a reference signal to the comparator in each of the plurality of optical channel regulators.

4. The optical channel regulator of claim 3, wherein each optical channel regulator further comprises:

a second tapped optical coupler receiving an input optical signal, the second tapped optical coupler providing substantially all of the input optical signal as the optical signal received by the electrically variable optical attenuator and providing a remaining portion of the input optical signal as a tapped output; and a second optical detector receiving the tapped output from the second tapped optical coupler and providing an electrical signal representing the input optical signal.

5. An optical channel regulator assembly comprising:

a plurality of optical channel regulators, each optical channel regulator comprising:

an electrically variable optical attenuator;

a tapped optical coupler;

an optical detector; and a comparator; and a microprocessor, operable to:

receive the electrical signal representing the input optical signal from each of the plurality of optical channel regulators;

generate a plurality of reference signals responsive to the electrical signals; and provide a reference signal to the comparator in each of the plurality of optical channel regulators.

6. The optical channel regulator of claim 5, wherein each optical channel regulator further comprises:

a second tapped optical coupler receiving an input optical signal, the second tapped optical coupler providing substantially all of the input optical signal as the optical signal received by the electrically variable optical attenuator and providing a remaining portion of the input optical signal as a tapped output; and a second optical detector receiving the tapped output from the second tapped optical coupler and providing an electrical signal representing the input optical signal.

7. A multiple channel wavelength division multiplexed communication system comprising:

a plurality of transmission channels;

a plurality of optical regulators operable to receive a plurality of optical signals from said plurality of transmission channels, each optical regulator comprising:

an electrically variable optical attenuator;

a tapped optical coupler;

an optical detector; and
a comparator;

a first microprocessor, operable to:
receive an electrical signal representing the attenuated optical signal from each of the plurality of optical regulators;
generate a plurality of reference signals responsive to the electrical signals; and
provide a reference signal to the comparator in each of the plurality of optical regulators;

an optical combiner operable to receive a plurality of said attenuated signals;

a first optical amplifier operable to receive an output signal from said optical combiner;

a second optical amplifier operable to receive an output signal from said first optical amplifier;

a third optical amplifier operable to receive an output signal from said second optical amplifier;

an optical demultiplexer operable to receive an output signal from said third optical amplifier and recover said plurality of optical signals;

a plurality of optical regulators operable to receive a plurality of optical signals from said optical demultiplexer, each optical regulator comprising:
an electrically variable optical attenuator;
a tapped optical coupler;
an optical detector; and
a comparator;

a second microprocessor, operable to:
receive the electrical signal representing the input optical signal from each of the plurality of optical regulators;
generate a plurality of reference signals responsive to the electrical signals; and
provide a reference signal to the comparator in each of the plurality of optical regulators; and a plurality of receive channels operable to receive a plurality of optical signals from said plurality of optical regulators.

8. The optical channel regulator of claim 7, wherein each optical channel regulator further comprises:

a second tapped-optical coupler receiving an input optical signal, the second tapped optical coupler providing substantially all of the input optical signal as the optical signal received by the electrically variable optical attenuator and providing a remaining portion of the input optical signal as a tapped output; and a second optical detector receiving the tapped output from the second tapped optical coupler and providing an electrical signal representing the input optical signal.

* * * * *